Patented June 21, 1938

2,121,334

UNITED STATES PATENT OFFICE 2,121,334

METHOD OF PREPARING AN OIL VARNISH

George Barsky, New York, N. Y.

No Drawing. Application June 13, 1935,
Serial No. 26,401

10 Claims. (Cl. 134—26)

This invention relates to oil varnishes, namely, to varnishes made with drying oils and containing synthetic resins.

Oil resin varnishes of the type discussed herein and comprising a drying oil, a resin, and usually an organic solvent, have been in use for an extremely long period. Such use dates back at least several hundred years. At the beginning of the use of oil varnishes it was customary to provide a composition of the drying oil with a naturally occurring resin. The method generally used, for incorporating the resin for modifying the characteristics of the oil and rendering it more adaptable for the purpose, was by making a mixture of the oil with the resin and heating or "cooking" the mixture until blending took place. While there has been no clear determination of what occurs during the heating, it is more than likely that in many cases there is a partial decomposition and a chemical change, usually with a chemical combination of some sort between the oil and the resin.

Among the resins first used for this purpose were amber, rosin, and the like. From time to time new resins were found, such as copal and the like, which imparted more desirable characteristics to the oil or increased and intensified characteristics already present. The purpose of the use of these resins was principally to improve the water-resistance, hardness, gloss, weathering, gas-proofness, solubility, drying properties, and the like of the oil varnish.

Later, when synthetic resins began to be applied in other industries, it was natural for varnish manufacturers to turn to such resins. One of the first synthetic resins used about fifty years ago was the so-called "ester gum" which is the reaction product of rosin or like natural resin acids and glycerine. Other synthetic resins were used for this purpose as, for example, the phenol-formaldehyde type of resins modified with rosin to render them more soluble.

About 1901, Watson Smith produced the phthalic glyceride resin which was found to have highly desirable properties and which, if it could be incorporated with a drying oil, would impart such desirable properties to the oil varnish. However, it was not found possible to directly incorporate this type of resin with the drying oil. Later, various investigators modified the phthalic glyceride resins by the use of various organic acids, such as the fatty acids, aromatic acids, and various others. Such resins had sufficient solubility in common solvents for use in spirit varnishes.

It has also been proposed to form an oil varnish by heating an oil with phthalic glyceride resin in the presence of a common solvent having a high boiling point. While blending may be possible by such a procedure, the product would not be commercially usable as the solvent would interfere with the drying qualities of the varnish. If boiling off of the solvent were attempted, decomposition and other undesirable changes would take place in the varnish and thus render it unfit for use.

The present invention seeks to produce an oil varnish composition which has all of the desirable properties of the phthalic glyceride resins and seeks to incorporate this type of resin into drying oils. Specifically, in order to accomplish the result, I first modify the phthalic glyceride resin by the use of organic acids, such as the fatty acids. I have found that, even when the amount of fatty acid combined with the phthalic glyceride is so low that ordinarily blending thereof with an oil has not been possible, good solubility of the resin in a drying oil can be readily obtained in accordance with the present invention.

As a specific example of the type of resin which may be used, I mention the reaction product containing castor oil or the fatty acids thereof, such as the resin described in the patent to Howell, No. 1,098,728, dated June 2, 1914. This type of resin when reacted to a completely hardened state, that is, when the reaction is carried on to make a product which is substantially completely esterified and which has been gelled, the solubility thereof on cooking in such oils as linseed, tung, soya bean, or the like, is sufficiently high so that a varnish may be made of almost any desired practical oil length.

This discovery is directly contrary to statements made by prior investigators, who considered that a castor oil phthalic glyceride resin containing a moderate proportion of castor oil, was capable of being blended with only a limited amount of drying oils and in order to obtain even this limited solubility, such investigators stated that it was essential not to allow the resin to become completely esterified or resinified and it was necessary to avoid gellation thereof. The present invention includes the discovery that good solubility is obtained when the gellation stage has been reached. Thereafter, the gelled resin may be added to and cooked into the oil without any difficulty.

I have also found that a phthalic glyceride modified with other fatty acids, such as stearic, but particularly fatty acids which have at least one double bond, such as oleic acid, also have the property of being blended with the drying oil on cooking, even if the amount of the fatty acid in the resin is so small that the resin gels on heating. Usually, there should be present in such resin an amount of the fatty acid, calculated as the triglyceride, of about 140 parts or less to 148 parts of phthalic anhydride. Stated in another way, the amount of the fatty acid in the resin should be less than about 120 parts to 148 parts of the phthalic anhydride.

The following are several specific examples of the operation of the present invention to produce the results contemplated herein.

Example 1

148 parts by weight of phthalic anhydride are mixed with 65 parts of 95% glycerine, the mixture heated to a temperature of 170° to 180° C. and held at such a temperature for approximately one hour, or until the two layers disappear and a clear solution is formed. Then approximately 75 parts by weight of castor oil are added and the temperature of the mixture raised to 210° C. where it is held for about two hours, or until there is a complete blending of the two layers into a clear resin.

75 parts by weight of soya bean oil are heated up to 280° C. and to this is added the molten resin described above from time to time with stirring. Upon the addition of the resin, it becomes gelled by contact with the hot oil, after which it swells and finally dissolves in the oil. With each addition the time needed for solution or blending diminishes until at the end of the operation, solution of the resin in the oil is very fast.

Example 2

300 parts of the castor oil phthalic glyceride as formed above may be further heated, as in an oven, at a temperature of 150° C. for a period from 12 to 24 hours. The resin then becomes an infusible mass, which is broken into pieces of small size. 100 parts by weight of linseed oil are heated to a temperature of 290° C. and maintained at such temperature with additions of the hardened castor oil resin with stirring, and preferably in an atmosphere of carbon dioxide to prevent discoloration. The resin swells immediately upon being introduced into the oil and readily disintegrates and dissolves.

Example 3

A mixture is made of 75 parts by weight of oleic acid, 148 parts of phthalic anhydride and 70 parts of glycerine. The mixture is heated slowly to a temperature of about 200° C. and said temperature is maintained for about two hours, with constant stirring and with the introduction of carbon dioxide gas until blending and formation of the resin is complete. The temperature of the resin may then be raised to 260°-270° C. and 150 parts of a mixture of linseed and tung oil are introduced slowly and with stirring until complete blending has taken place. The oil mixture consists of approximately 2 parts of linseed oil to 1 part of tung oil.

In each of the procedures given above, after the blending of the resin with the oil is complete, the solution or oil varnish base is allowed to cool to a temperature of 100° C. and hydrocarbon or other solvents are added with stirring to produce the varnish solution. By the present invention it is possible to utilize resins in which the ratio of phthalic anhydride to fatty acid is at least 2 to 1 and blend the same completely with a drying oil to produce a varnish base.

I have found it extremely satisfactory in blending the modified phthalic glyceride resin with the drying oil to use an oil having a high acid number. The lower the percentage of castor oil in the resin, the more friable is the castor oil glyceride resin, which is in many cases highly desirable, but I usually prefer to have present in the resin about 30% castor oil. The amount of glycerine used in the making of the resins is not critical and a slight excess thereof may be used without interfering with the utility of the resin or changing the characteristics of the varnish made therefrom. It is feasible to vary the proportion of the castor oil phthalic glyceride, for example, to the linseed oil within wide limits. Excellent varnishes are produced when in the final blended composition there is present about 20 parts of castor oil to 25-55 parts of linseed oil with a phthalic glyceride content of not over 50%, and the drying oil content may be about 80 parts to 20 parts of castor oil.

In general, the ratio of the oleic acid component of the resin to the phthalic is less than 5 to 6. The amount of drying oil which may be incorporated in the above described varnishes may be increased to any desired degree.

Although I have described my invention setting forth several specific embodiments thereof, my invention is not to be considered to be limited to the procedures set forth nor to the proportions or temperatures or other conditions. These examples were intended to illustrate the invention and not to limit it. For example, the various ratios of the ingredients, as well as the temperature and times of treatment, may be varied to a large extent. Various mixtures of drying oils and even of drying oils with semi- or non-drying oils may be used. It is not necessary to first heat the oil and then blend the resin with it, nor is it necessary to have the resin in molten condition when introducing it into the oil. While in the examples I have indicated the use of castor oil or the like, it is possible to use other oils having similar characteristics and capable of being directly blended with the phthalic anhydride and glycerine. In place of or in conjunction with phthalic anhydride and glycerine, equivalent substances may be employed. Or, I may use fatty acids in place of the oil, although generally I find it more economical to use the oil. By complete esterification I do not mean that there are no free OH or COOH groups present, but the term indicates that the acid number on resin formation has reached a minimum.

These and other changes may be made in the details described above without departing from the spirit of the invention, the scope of which is set forth in the claims appended hereto.

What I claim is:

1. A method of preparing an oil varnish which comprises providing a castor oil phthalic glyceride resin, the ratio of the modifying ingredient to the phthalic glyceride being such that said resin gels on heating, heating the same until esterification is complete and gelation has set in, and blending the same with a drying oil by heating said resin with said oil, whereby the resin is directly dispersed in said oil without the use of an intermediate high-boiling solvent.

2. A method of preparing an oil varnish which comprises providing a castor oil phthalic glyceride resin, the ratio of the modifying ingredient to the phthalic glyceride being such that said resin gels on heating, heating the same until esterification is complete and gelation has set in, and blending the same with a drying oil by heating said resin with said oil, the drying oil being in greater amount than the castor oil, whereby the resin is directly dispersed in said oil without the use of an intermediate high-boiling solvent.

3. A method of preparing an oil varnish which comprises providing a castor oil phthalic glyceride resin, the ratio of the modifying ingredient to the phthalic glyceride being such that said resin gels on heating, containing over about 30% of castor oil, heating the same until esterification is complete and gelation has set in, and blending the same with a drying oil by heating said resin with said oil, whereby the resin is directly dispersed in said oil without the use of an intermediate high-boiling solvent.

4. A method of preparing an oil varnish which comprises providing a phthalic glyceride resin modified by a fatty acid of a vegetable oil having at least one double bond, the ratio of the modifying ingredient to the phthalic glyceride being such that said resin gels on heating, and heating the same with a drying oil to first cause gelation and then blending, whereby the resin is directly dispersed in said oil without the use of an intermediate high-boiling solvent.

5. A method of preparing an oil varnish which comprises providing a phthalic glyceride resin modified by a fatty acid of a vegetable oil having at least one double bond, the ratio of the modifying ingredient to the phthalic glyceride being such that said resin gels on heating, and heating the same with a drying oil to first cause gelation and then blending, the ratio of fatty acid to drying oil being less than one, whereby the resin is directly dispersed in said oil without the use of an intermediate high-boiling solvent.

6. A method of preparing an oil varnish which comprises providing a phthalic glyceride resin modified by a fatty acid of a vegetable oil having at least one double bond, the ratio of the modifying ingredient to the phthalic glyceride being such that said resin gels on heating, and heating the same with a drying oil to first cause gelation and then blending, the drying oil being in greater amount than the fatty acid, whereby the resin is directly dispersed in said oil without the use of an intermediate high-boiling solvent.

7. A method of preparing an oil varnish which comprises providing an oleic acid phthalic glyceride, the ratio of the modifying ingredient to the phthalic glyceride being such that said resin gels on heating, and heating the same with a drying oil to first cause gelation and then blending, whereby the resin is directly dispersed in said oil without the use of an intermediate high-boiling solvent.

8. A method of preparing an oil varnish which comprises providing an oleic acid phthalic glyceride, the ratio of the modifying ingredient to the phthalic glyceride being such that said resin gels on heating, the ratio of oleic acid to phthalic anhydride being about 5 to 6, and heating the same with a drying oil to first cause gelation and then blending, whereby the resin is directly dispersed in said oil without the use of an intermediate high-boiling solvent.

9. A method of preparing an oil varnish which comprises providing a phthalic glyceride resin modified by a fatty acid of a vegetable oil, the ratio of the modifying ingredient to the phthalic glyceride being such that said resin gels on heating, the ratio of phthalic anhydride to fatty acid being at least 2 to 1, and heating the same with a drying oil to first cause gelation and then blending, whereby the resin is directly dispersed in said oil without the use of an intermediate high-boiling solvent.

10. A method of preparing an oil varnish which comprises providing a phthalic glyceride resin modified by an acid taken from the group consisting of saturated higher fatty, unsaturated higher fatty and hydroxylated higher fatty, the ratio of the modifying ingredient to the phthalic glyceride being such that said resin gels on heating, and heating the same with a drying oil to first cause gelation and then blending, whereby the resin is directly dispersed in said oil without the use of an intermediate high-boiling solvent.

GEORGE BARSKY.